United States Patent [19]
Citta

[11] Patent Number: 5,301,019
[45] Date of Patent: Apr. 5, 1994

[54] DATA COMPRESSION SYSTEM HAVING PERCEPTUALLY WEIGHTED MOTION VECTORS

[75] Inventor: Richard W. Citta, Oak Park, Ill.

[73] Assignee: Zenith Electronics Corp., Glenview, Ill.

[21] Appl. No.: 947,024

[22] Filed: Sep. 17, 1992

[51] Int. Cl.$^5$ .............................................. H04N 7/133
[52] U.S. Cl. ................................................... 348/416
[58] Field of Search .............................. 358/105, 136; H04N 7/133, 7/137

[56] References Cited

U.S. PATENT DOCUMENTS

| | | | |
|---|---|---|---|
| 5,134,477 | 7/1992 | Knauer | 358/105 |
| 5,142,360 | 8/1992 | Niihara | 358/105 |
| 5,173,773 | 12/1992 | Ueda | 358/105 |

*Primary Examiner*—Howard W. Britton

[57] ABSTRACT

A data compression system responsive to a preprocessed digitally encoded high definition video signal includes a discrete cosine transform, a frequency weighting filter, and an inverse discrete cosine transform circuit to provide a digitally encoded video signal within which the high frequency terms of the discrete cosine transform have been reduced. A motion compensated predictive coding data compression system organizes the current frame and a previous frame into a plurality of pixel blocks. The pixel blocks are compared by an error calculating and matching circuit under the influence of a timing control to provide an error value output. A spatial weighting factor is applied to each error value output to provide spatially weighted error values which are used to produce a corresponding plurality of motion vectors. The motion vector corresponding to the lowest weighted error value is selected by a motion vector selector for application to a channel buffer/encoder and eventual transmission.

26 Claims, 2 Drawing Sheets

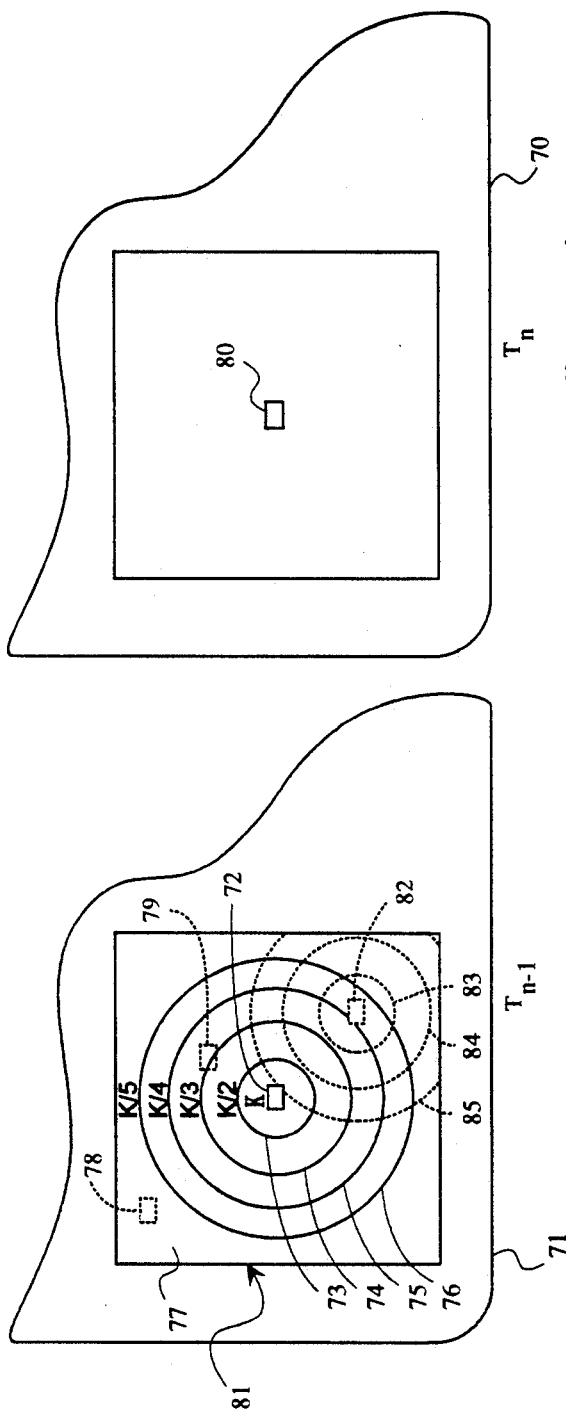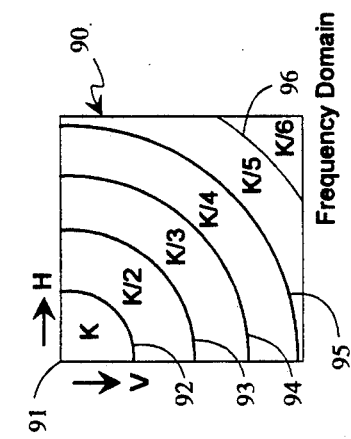

5,301,019

DATA COMPRESSION SYSTEM HAVING PERCEPTUALLY WEIGHTED MOTION VECTORS

FIELD OF THE INVENTION

This invention relates generally to high definition television transmission and particularly to data compression systems used therein.

BACKGROUND OF THE INVENTION

The transmission of high definition television signals dramatically increases the amount of image information within the broadcast signal over that present in conventional television broadcast formats such as the NTSC format used in the United States of America. In view of the limited number of television broadcast channels available and the generally crowded condition of available broadcast spectra, it is advantageous to transmit high definition television signals in a so-called spectrum compatible format. Spectrum compatible requires that high definition television signals be capable of transmission within a standard six megahertz channel bandwidth used in the NTSC format. Because the image information required for high definition television transmission greatly exceeds that which may be fitted within a standard six megahertz bandwidth, practitioners in the art employ digital video information coding and sophisticated data compression techniques. While a number of types of data compression systems have been devised, generally all make use of the tendency of the image information between successive image frames to include significant redundancy.

In one type of data compression system, often referred to as motion compensated predictive coding, temporal redundancies are removed from the transmitted signal using a process which divides each image frame into a plurality of image or pixel blocks. The process then compares the video pixels in each block within the current image frame to the pixels within each block of the previous image frame. These comparisons are typically carried forward using means square error or absolute error computation to identify the most closely matching set of image blocks in the current frame and previous frame. The change in position of the matching block within the current frame from that of the corresponding image block in the previous frame is used to generate a so-called motion vector. The motion vectors associated with each image block are then transmitted and used within the high definition television receiver to read blocks of stored pixels representing the previous frame and reconstruct the blocks of the current frame.

Several problems are inherent in such data compression techniques which arise largely from the purely mathematical algorithm used to identify matching pixel blocks and generate the motion vectors. One manifestation of such problems arises from the possibility that the image block matching operation may, in essence, incorrectly match a current frame image block and previous frame image block due to the comparison being based upon the smallest error or difference between image blocks. This may result in substantial noise in the reproduced block and may also adversely affect the error masking operation carried forward within the receiver.

In anticipation of the reception of erroneous or contaminated data due to transmission difficulties and the like, the high definition television receiver utilizes an error masking system to minimize the degradation of the displayed image when incorrect or contaminated data is presented. In essence, such error masking systems utilize the image information received prior to the detected errors or data contamination. In the operation of motion compensated predictive coding data compression operations, the error masking system usually utilizes the previous motion vector to reconstruct the current image frame. This process, of course, is based upon the assumption that the video image is characterized by continuous motion and thus the previous motion vector will generate a block of pixels close to the desired block. In some instances, however, such as scene changes or the like, this assumption proves to be invalid and the error masking process will fail.

Another problem associated with data compression systems using motion compensated predictive coding techniques is their susceptibility to high frequency noise. In essence, high frequency noise may unduly influence or, in some instances, dominate the pixel block matching process. This again raises the possibility for incorrectly matching pixel image blocks within the current and previous frames and, as a result, generating erroneous motion vectors.

There remains, therefore, a continuing need in the art for evermore improved data compression systems which function reliably in the presence of noise or other image discontinuities such as scene changes, special effects or the like.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 2A and 2B set forth image diagrams illustrating the spatially weighted motion vector processing of the present invention system; and FIG. 3 sets forth a diagram illustrating the frequency weighted aspect of the present invention system.

DESCRIPTION OF THE PREFERRED EMBODIMENT

Figure 1:
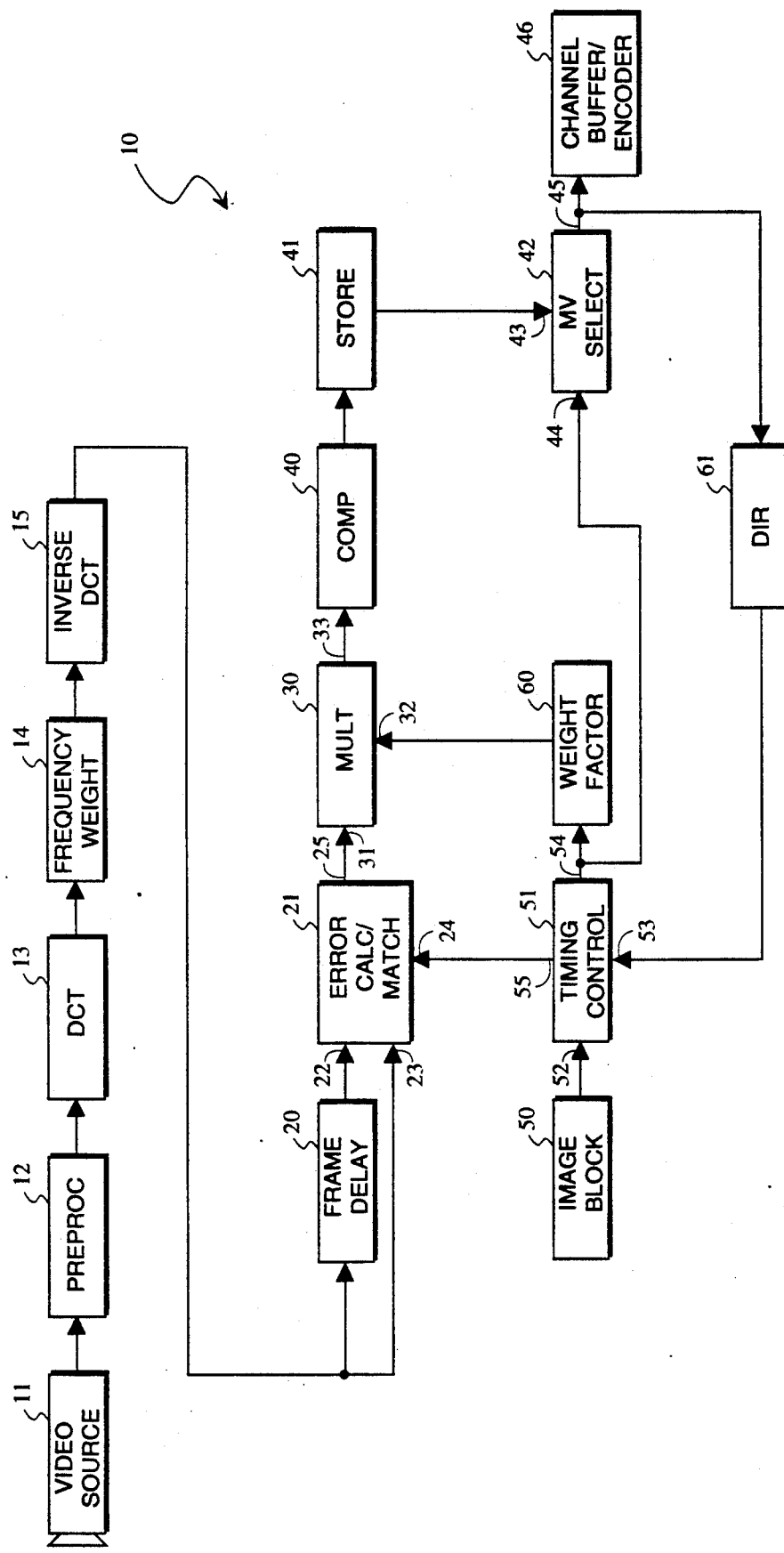
FIG. 1 sets forth a block diagram of a data compression system having perceptually weighted motion vectors and constructed in accordance with the present invention.

FIG. 1 sets forth a block diagram of a data compression system constructed in accordance with the present invention and generally referenced by numeral 10. A source of high definition video information such as a high definition television camera 11 is coupled to a preprocessor 12 which in turn is coupled to a discrete cosine transform circuit 13. The output of transform circuit 13 is coupled to a frequency weighting circuit 14. The output of frequency weighting circuit 14 is coupled to an inverse discrete cosine transform circuit 15, the output of which is coupled to a frame delay 20 and an error calculating and matching circuit 21. Error calculating and matching circuit 21 includes an input 22 coupled to the output of frame delay 20, an input 23 directly coupled to output of inverse transform circuit 15, a control input 24 and an error information output 25. A multiplier 30 includes an input 31 coupled to output 25 of error calculating and matching circuit 21, an input 32, and an output 33. A comparator circuit 40 is coupled to output 33 of multiplier 30 and produces an output signal coupled to memory 41.

An image block generating circuit 50 is coupled to input 52 of timing control 51 Timing control circuit 51 further includes an input 53, an output 55 coupled to input 24 of error calculating and matching circuit 21, and a horizontal and vertical incrementing signal output 54. A weight factor circuit 60 is coupled to output 54 of timing control 51 and to input 32 of multiplier 30.

A motion vector selection circuit 42 includes an input 43 coupled to the output of memory 41, an input 44 coupled to output 54 of timing control 51, and an output 45 coupled to channel buffer and encoder 46. Output 45 of motion vector selection circuit 42 is further coupled to input 53 of timing control 51 by a direction circuit 61.

In operation and by way of overview, the high definition video information from source 11 is preprocessed by processor 12 to provide digitally encoded high definition video information. The digitally encoded high definition information is initially frequency weighted by frequency weighting circuit 14 which applies a smoothly decreasing weighting function to weight the low frequency components of the pixel information more than the high frequency components. Thus, the high frequencies of the pixel blocks are given less weight than the lower frequencies of the blocks when the matching algorithm is executed. This frequency weighting is carried forward by the transform coding provided by discrete cosine transform circuit 13 or using horizontal and vertical filters having the desired smooth roll off responses or two dimensional filtering. The frequency weighted pixel block information in each current image frame is then matched to the corresponding pixel image block of a delayed previous frame using a spatially weighted function which favors pixel blocks in the previous frame which are closest in proximity to a given block in the current frame. Based upon this spatially weighted matching process and the previously imposed frequency weighting process, motion vectors are produced for each pixel block which are both spatially and frequency weighted. These spatially and frequency weighted motion vectors are then coupled to the channel buffer/encoder for further processing and transmission.

More specifically, video source 11 provides a source of high definition video information and may, for example, comprise a high definition camera. The high definition video information is preprocessed by processor 12 to provide appropriate digitally encoded high definition video information. The digitally encoded high definition video information from preprocessor 12 is converted to a frequency domain signal by discrete cosine transform circuit 13. In accordance with the conventional operation of transform circuit 13, successive blocks of digitally encoded video information are converted to corresponding blocks of transform coefficients. The transform coefficients are then processed by frequency weighting circuit 14 which applies a frequency weighting function to the transform coefficients. It should be recalled that the frequency weighted function is carried forward by frequency weighting circuit 14 to provide system 10 with frequency weighted motion estimators or vectors following the processing set forth below. An inverse discrete cosine transform circuit 15 converts the frequency weighted transform coefficients to a time domain digitally encoded signal which is applied simultaneously to frame delay 20 and matching circuit 21. The function of frame delay 20 is to provide a full frame delay of the frequency weighted digitally encoded video information which serves as a "previous frame" in carrying forward the pixel block matching function of error calculator and matching circuit 21.

Timing control 51 operates in response to image block size information and organization provided by an image block processor 50. In essence, timing control 51 functions to organize the current and previous frames into a plurality of pixel blocks and matching playgrounds. Thus, timing control 51 provides the necessary input information for error calculation and matching circuit 21 which enables the comparison of each pixel block within the current frame applied at input 23 to each pixel block within a predetermined playground of the pixel block in a previous frame stored in frame delay 20 forming a delayed frame at input 22. Error calculating and matching circuit 21 carries forward a matching or error signal computation such as absolute error calculation. Alternatively, other error calculation methods may be used such as means square error calculation or the like. In any event, the error signal for each comparison of each pixel block within the current frame to each pixel block within the predetermined playground of the pixel block in a previous or delayed frame range produces a corresponding set of error signals which are squared and outputted to multiplier 30.

In accordance with an important aspect of the present invention, timing control 51 provides a set of horizontal and vertical increment signals which are related to the pixel block being examined and which are coupled to weighting circuit 60. Weighting circuit 60 determines the proximity or spatial relationship between the current frame pixel block and each pixel block within the predetermined playground of the pixel block in a previous image frame. Spatial weighting factors utilized by weight factor circuit 60 are set forth in FIG. 2A and described below in greater detail. However, suffice it to note here that weight factor circuit 60 responds to the position information provided by timing control 51 to determine the distance or proximity between each pixel block within the predetermined playground of a previous frame and the current frame pixel block under comparison. In response to the position or distance information, a weighting factor is applied by weight factor circuit 60 to input 32 of multiplier 30. The spatial weighting provided by weight factor circuit 60 is greatest for pixel blocks most proximate to the current pixel block and progressively less with increased distance between the previous frame pixel block and the current frame pixel block. Multiplier 30 applies the weighting factor provided by weight factors circuit 60 to the error or matching signal produced by error calculation and matching circuit 21 to produce a weighted error signal which is applied to comparator 40. Comparator 40 is coupled to a memory 41 within which the smallest weighted error signal and its associated motion vector have been previously stored. Each weighted error signal is compared to the presently stored smallest weighted error signal by comparator 40. Each time the received weighted error signal is smaller than the currently stored smallest value, comparator 40 replaces the current value with the new smallest weighted error signal and its associated motion vector.

It should be noted that in its illustrated form, the present invention spatial weighting is shown (see FIG.

2A) centered at the pixel block current frame position. It may, in some circumstances, however, be desirable to offset the weighting pattern to respond for example to a predicted position of the current frame pixel block as shown in dashed line in FIG. 2A and described in detail below.

Once error calculation and matching circuit 21 has completed comparisons for each pixel block within the predetermined playground in a previous frame for a given current pixel block, the motion vector corresponding to the smallest weighted error value is selected by motion vector selector 42 for application to channel buffer and encoder 46 for further processing and transmission. The selected motion vector is fed back to timing control circuit 51 by a direction circuit 61 which provides the required motion vector or direction information for timing control 51.

The above-described process is carried forward for each pixel block within each current frame to derive a motion vector for each pixel block in the current frame which is then encoded and utilized by the receiver in reconstructing the received image. In accordance with an important aspect of the present invention, the frequency weighting of the motion vectors produced by system 10 substantially minimizes the effect upon motion vector generation due to high frequency noise. The use of spatially weighted motion vector information further improves the motion vector generation of the present invention system by favoring pixel blocks within the previous frame having the closest proximity to the current frame pixel block. Based upon this preference, motion vectors generated in response to the spatially weighted characteristic are most likely to be correct and reliable and least likely to be erroneous results of noise or similar pixel patterns.

It should be noted that the spatial and frequency weighted motion vector generation of the present invention provides influence for the comparison and matching process while nonetheless permitting the motion compensating predictive coding function to be carried forward. Thus, for example, in the spatial weighting, less proximate closely matching pixel blocks are not excluded in favor of poorly matching more proximate pixel blocks due to the careful selection of the weighting factors.

FIGS. 2A and 2B set forth a pair of diagrams illustrating the spatial weighting factor characteristic of the present invention system. An image block 80 is shown in FIG. 2B within a current frame 70. A previous frame 71 (FIG. 2A) sets forth an image playground 81 generally centered upon the location of pixel or image block 80 which in frame 71 is referenced by location numeral 72. A plurality of concentric circles 73, 74, 75 and 76 divide playground 81 under examination within previous frame 71 into a plurality of spatially weighted regions. It should be noted that, while for purposes of illustration a plurality of discrete weighting zones are shown by concentric circles 73 through 76, in the preferred embodiment of the present invention, the weighting function in fact is configured to vary smoothly and continuously from its maximum value at center location 72 to its minimum value at the outer portions of playground 77.

Thus, concentric circles 73 through 76 should be thought of as graduations within a continuous smooth function which are provided for reference purposes only.

In operation, as the above-described system provides the above-described error calculation and matching process, each pixel block within matching playground 81 will be examined and compared to pixel block 80 to derive an error calculation. This calculation is derived solely in response to the similarity or lack of similarity between the pixels within pixel block 80 and the respective previous frame pixel blocks. If, for example, the error calculation and matching circuit set forth above locates a pair of pixel blocks shown in dashed-line representation and referenced by numerals 78 and 79 within previous frame 71 which are substantially similar to pixel block 80, it would be anticipated that the error value for pixel blocks 78 and 79 would be similar or close. In accordance with the present invention, the application of a substantially greater weighting factor to pixel block 79 corresponding to K/2 or K/3 and a substantially smaller weighting factor corresponding to K/5 for pixel block 78 during the above-described spatial weighting process causes the motion vector generating system to substantially prefer or favor pixel block 79 and generate a motion vector based upon the assumption that pixel block 79 is the pixel block within previous frame 79 which corresponds to image block 80 in current frame 70.

In the event, however, the situation is reversed and pixel block 78 is very similar to pixel block 80 while pixel block 79 is merely somewhat similar, the error or matching calculation will prevail notwithstanding the application of the spatial weighting factor. This is necessary in selecting the weighting constants to assure that the system does not simply convert to a proximity based system and ignore or virtually ignore the pixel comparison for each pixel block.

It should be noted that the present invention system may offset the spatial weighting contours to suit additional circumstances. For example, in the event a consistent value motion vector is encountered, indicating a continuous motion of a pixel block, a predictive spatial weighting may be used. Thus, in FIG. 2A, an offset predicted weighting pattern shown in dashed lines may be used. In this example, the continuous previous motion of pixel block 80 predicts its position in previous frame 71 to have been dashed line block 82. Accordingly, a plurality of spatial weightings such as dashed line circles 83 through 85 may then be used.

FIG. 3 sets forth a frequency domain constant chart for the above-described frequency weighting system generally referenced by numeral 90. Chart 90 may be envisioned as a frequency response plot for a two-dimensional horizontal and vertical filter system. While the filter characteristics utilized by the present invention frequency weighting are, in their preferred form, smooth roll-off response characteristics having maxima at low frequencies and minima at high frequencies, a plurality of indicating boundaries 92, 93, 95 and 96 forming concentric arcs spaced from origin 91 are shown in filter characteristic 90 for purposes of illustration. Thus, when filter characteristic 90 is applied to the discrete cosine transform coefficients provided by transform circuit 13 (seen in FIG. 1), progressively smaller weighting factors are applied to the transform coefficients for the higher frequency terms. As a result, the importance or influence of high frequency term coefficients within the discrete cosine transform is substantially reduced. This provides the above-described capability of the present invention system to be less influenced by high frequency noise in the selection of matching pixel blocks the resulting motion vector generation.

It should be noted that the present invention perceptual weighting described and set forth above focuses primarily upon the use of spatial and frequency motion vector generation. It should be apparent, however, that in practicing the present invention, other perceptual qualities and characteristics may be used as weighting criteria either in place of or in addition to spatial and frequency weighting. For example, the present invention system may readily utilize weighting factors which are influenced by such inputs as motion vector consistency or the like. The important aspect of the present invention is that perceptual weighting is image related rather than mere mathematical processing as used in prior art systems.

Thus, what has been shown is a data compression system having perceptually weighted motion vectors. In the embodiment described, both spatial weighting and frequency weighting are utilized to influence the generation of motion vectors in a motion compensated predictive coding data compression system. The example set forth is configured to provide greater influence upon motion vector generation for close proximity pixel blocks while providing less influence for high frequency information. In this manner, the reliability of motion vector generation is substantially improved. The system is also less sensitive to noise in its generation of motion vectors using both spatial and frequency weighted matching.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A data compression method for compressing a digitally encoded video signal organized in a succession of image frames, said method comprising the steps of:
   receiving said digitally encoded video signal;
   comparison/matching selected portions of said video signal in a current image frame to portions of said video signal in an image frame preceding said current image frame to produce corresponding error values indicative of the differences therebetween;
   generating a motion vector for each comparison in said comparison/matching step in association with each corresponding error value;
   weighting each of said error values in accordance with a perceptual factor to produce perceptually weighted error values; and
   selecting one of said motion vectors by applying a selection criteria to each of said perceptually weighted error values and selecting the motion vector associated with the one of said perceptually weighted error values which best fits said criteria.

2. The method of claim 1 wherein said comparing step includes the steps of:
   dividing a current image frame into a plurality of current frame pixel blocks;
   dividing said preceding image frame into a plurality of previous frame pixel blocks;
   selecting one of said current frame pixel blocks; and
   comparing said selected one of said current frame pixel blocks to each of said previous frame pixel blocks within a predetermined range to produce said error values.

3. The method of claim 2 wherein said step of generating a motion vector includes the steps of:
   establishing each motion vector as the direction and distance between the position of each of said previous frame pixel blocks within said previous image frame and said selected one of current frame pixel blocks; and
   associating each generated motion for each previous frame pixel block with the error value corresponding thereto.

4. The method of claim 2 wherein said weighting step includes the step of multiplying each of said error values by a spatial weighting factor which is inversely related to the spatial separation between said selected current frame pixel block and said previous frame pixel block.

5. The method of claim 2 further including the steps of:
   converting said digitally encoded video signal to a frequency domain signal;
   weighting said frequency domain signal to reduce the higher frequency terms thereof to produce a frequency weighted frequency domain signal; and
   performing the inverse of said converting step upon said frequency weighted frequency domain signal.

6. A data compression system for compressing a digitally encoded video signal organized in successive image frames, said system comprising:
   means for receiving said digitally encoded video signal;
   means for comparison/matching selected portions of said video signal in a current image frame to portions of said video signal in an image frame preceding said current image frame to produce corresponding error values indicative of the differences therebetween;
   means for generating a motion vector for each comparison produced by said means for comparison/matching in association with each corresponding error value;
   means for weighting each of said error values in accordance with a perceptual factor to produce perceptually weighted error values; and
   means for selecting one of said motion vectors by applying a selection criteria to each of said perceptually weighted error values and selecting the motion vector associated with the one of said perceptually weighted error values which best fits said criteria.

7. A data compression system as set forth in claim 6 wherein said means for comparing includes:
   means for dividing a current image frame into a plurality of current frame pixel blocks;
   means for dividing an image frame preceding the current image frame into a plurality of previous frame pixel blocks;
   means for selecting one of said current frame pixel blocks; and
   means for comparing said selected one of said current frame pixel blocks to each of said previous frame pixel blocks within a predetermined range to produce said error values.

8. A data compression system as set forth in claim 7 wherein said means for generating a motion vector includes:

means for establishing each motion vector as the direction and distance between the position of each of said previous frame pixel blocks within said previous image frame and said selected one of current frame pixel blocks; and means for associating each generated motion for each previous frame pixel block with the error value corresponding thereto.

9. A data compression system as set forth in claim 7 wherein said means for weighting includes means for multiplying each of said error values by a spatial weighting factor which is inversely related to the spatial separation between said selected current frame pixel block and said previous frame pixel block.

10. A data compression system as set forth in claim 7 further including:

means for converting said digitally encoded video signal to a frequency domain signal;

means for weighting said frequency domain signal to reduce the higher frequency terms thereof to produce a frequency weighted frequency domain signal; and means for performing the inverse of said converting means upon said frequency weighted frequency domain signal.

11. For use in a television transmission system processing a video image signal organized into a plurality of successive image frames, a data compression method comprising the steps of:

receiving said video image signal;

organizing each image frame into a plurality of pixel blocks;

providing a current image frame and a preceding image frame concurrently;

comparing each pixel block in the current image frame to each pixel block in at least a portion of the preceding image frame and producing an error value for each comparison indicative of the degree of difference between the pixel block in the current image frame and the pixel block in the preceding image frame;

generating motion vectors indicative of the spatial relationship between each pixel block in the current image frame and each pixel block in the preceding image frame;

associating each error value produced with the corresponding motion vector generated;

weighting each of said error values in accordance with a perceptual factor to produce perceptually weighted error values; and selecting the motion vector from said generated motion vectors for each pixel block in the current image frame which has associated therewith the lowest magnitude perceptually weighted error value.

12. The method of claim 11 wherein said perceptual factor includes the spatial relationship between the pixel block in the current image frame and the pixel block in the preceding image frame.

13. The method of claim 11 further including the step of deemphasizing the higher frequency components of said video signal to frequency weight said motion vector selecting step.

14. For use in a television transmission system processing a video image signal organized into a plurality of successive image frames, a data compression system comprising:

means for receiving said video image signal;

means for organizing each image frame into a plurality of pixel blocks;

means for providing a current image frame and a preceding image frame concurrently;

means for comparing each pixel block in the current image frame to each pixel block in at least a portion of the preceding image frame and producing an error value for each comparison indicative of the degree of difference between the pixel block in the current image frame and the pixel block in the preceding image frame;

means for generating motion vectors indicative of the spatial relationship between each pixel block in the current image frame and each pixel block in the preceding image frame;

means for associating each error value produced with the corresponding motion vector generated;

means for weighting each of said error values in accordance with a perceptual factor to produce perceptually weighted error values; and means for selecting the motion vector from said generated motion vectors for each pixel block in the current image frame which has associated therewith the lowest magnitude perceptually weighted error value.

15. A data compression system as set forth in claim 14 wherein said perceptual factor includes the spatial relationship between the pixel block in the current image frame and the pixel block in the preceding image frame.

16. A data compression system as set forth in claim 14 further including the step of deemphasizing the higher frequency components of said video signal to frequency weight said means for motion vector selecting.

17. For use in a television transmission system processing a video signal organized into a plurality of successive image frames, a data compression method comprising the steps of:

organizing each current image frame into a plurality of current frame pixel blocks and each preceding image frame into a corresponding plurality of previous frame pixel blocks;

for each current frame pixel block, and each previous frame pixel block within a predetermined range in the preceding image frame, producing a perceptually weighted error value related to the perceptually weighted difference therebetween and a motion vector related to the spatial displacement therebetween; and selecting a motion vector for each current frame pixel block in response to a comparison of said perceptually weighted error values.

18. The method of claim 17 wherein said step of producing includes the steps of:

comparing the pixels within said current frame pixel block to those of each previous frame pixel block within a predetermined range to provide an error value magnitude; and multiplying said error value magnitude by a perceptual weighting factor to produce a perceptually weighted error value.

19. The method of claim 18 wherein said perceptual weighting factor includes spatial displacement between said current frame pixel block and each previous frame pixel block.

20. For use in a television transmission system processing a video signal organized into a plurality of successive image frames, a data compression system comprising:

means for organizing each current image frame into a plurality of current frame pixel blocks and each preceding image frame into a corresponding plurality of previous frame pixel blocks;

producing means operative for each current frame pixel block, and each previous frame pixel block within a predetermined range in a preceding image frame, for producing a perceptually weighted error value related to the perceptually weighted difference therebetween and a motion vector related to the spatial displacement therebetween; and means for selecting a motion vector for each current frame pixel block in response to a comparison of said perceptually weighted error values.

21. A data compression system as set forth in claim 20 wherein said producing means includes:

means for comparing the pixels within said current frame pixel block to those of each previous frame pixel block to provide an error value magnitude; and means for multiplying said error value magnitude by a perceptual weighting factor to produce a perceptually weighted error value.

22. A data compression system as set forth in claim 21 wherein said perceptual weighting factor includes spatial displacement between said current frame pixel block and each previous frame pixel block.

23. A method of motion compensated predictive coding of a video signal organized into a plurality of successive image frames comprising:

comparing a selected pixel block in a current frame with a plurality of pixel blocks in a preceding frame for generating a respective plurality of perceptually weighted error signals; and developing a motion vector predicting said selected block in response to said comparing step.

24. For use in a television signal transmission system processing a video signal organized into a plurality of successive image frames, a data compression method comprising the steps of:

organizing each image frame into a plurality of pixel blocks; and for each current frame pixel block, and each pixel block within at least a portion of a preceding image frame, producing a motion vector representing the smallest perceptually weighted error therebetween.

25. The method of claim 24 wherein said producing step comprises producing a motion vector representing the smallest spatially weighted error therebetween.

26. The method of claim 24 wherein said producing step comprises producing a motion vector representing the smallest frequency weighted error therebetween.

* * * * *